(12) United States Patent
Nastacio et al.

(10) Patent No.: US 8,209,708 B2
(45) Date of Patent: Jun. 26, 2012

(54) METHODS, SYSTEMS AND COMPUTER PROGRAM PRODUCTS FOR GENERATING EVENTS HAVING A COMMON EVENT FORMAT

(75) Inventors: Denilson Nastacio, Apex, NC (US); Jason Cornpropst, Mebane, NC (US); Carlos Cesar F. Araujo, Cary, NC (US); John E. Dinger, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2802 days.

(21) Appl. No.: 10/809,175

(22) Filed: Mar. 25, 2004

(65) Prior Publication Data

US 2005/0216576 A1 Sep. 29, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................................... 719/318

(58) Field of Classification Search .................. None
See application file for complete search history.

(56) References Cited

U.S. PATENT DOCUMENTS

| | | | | |
|---|---|---|---|---|
| 6,023,507 A * | 2/2000 | Wookey | ......................... | 709/224 |
| 6,219,701 B1 * | 4/2001 | Hirata et al. | ................... | 709/223 |
| 6,584,502 B1 * | 6/2003 | Natarajan et al. | ............. | 709/224 |
| 2002/0002634 A1 * | 1/2002 | Ueoka et al. | ................... | 709/319 |
| 2002/0087740 A1 * | 7/2002 | Castanho et al. | ............. | 709/318 |
| 2002/0178253 A1 * | 11/2002 | Sedlack | .......................... | 709/224 |
| 2003/0200486 A1 * | 10/2003 | Marwaha | ......................... | 714/39 |
| 2004/0128305 A1 * | 7/2004 | Levin et al. | .................... | 707/102 |

OTHER PUBLICATIONS

IEEE 100 The Authoritative Dictionary of IEEE Standards Terms, Dec. 2000, IEEE, Seventh Edition, p. 398.*

* cited by examiner

*Primary Examiner* — Krista Zele
*Assistant Examiner* — Matthew Lindsey

(57) ABSTRACT

Methods, systems and computer program products are provided for generating events having common formats by obtaining a populated common base event including source specific situation information for an event source. It is determined if a format of the populated common base event conforms to a predefined event format and a common event format representation of the populated common base event is generated based on the predefined event format if the format of the populated common base event does not conform to the predefined event format.

7 Claims, 11 Drawing Sheets

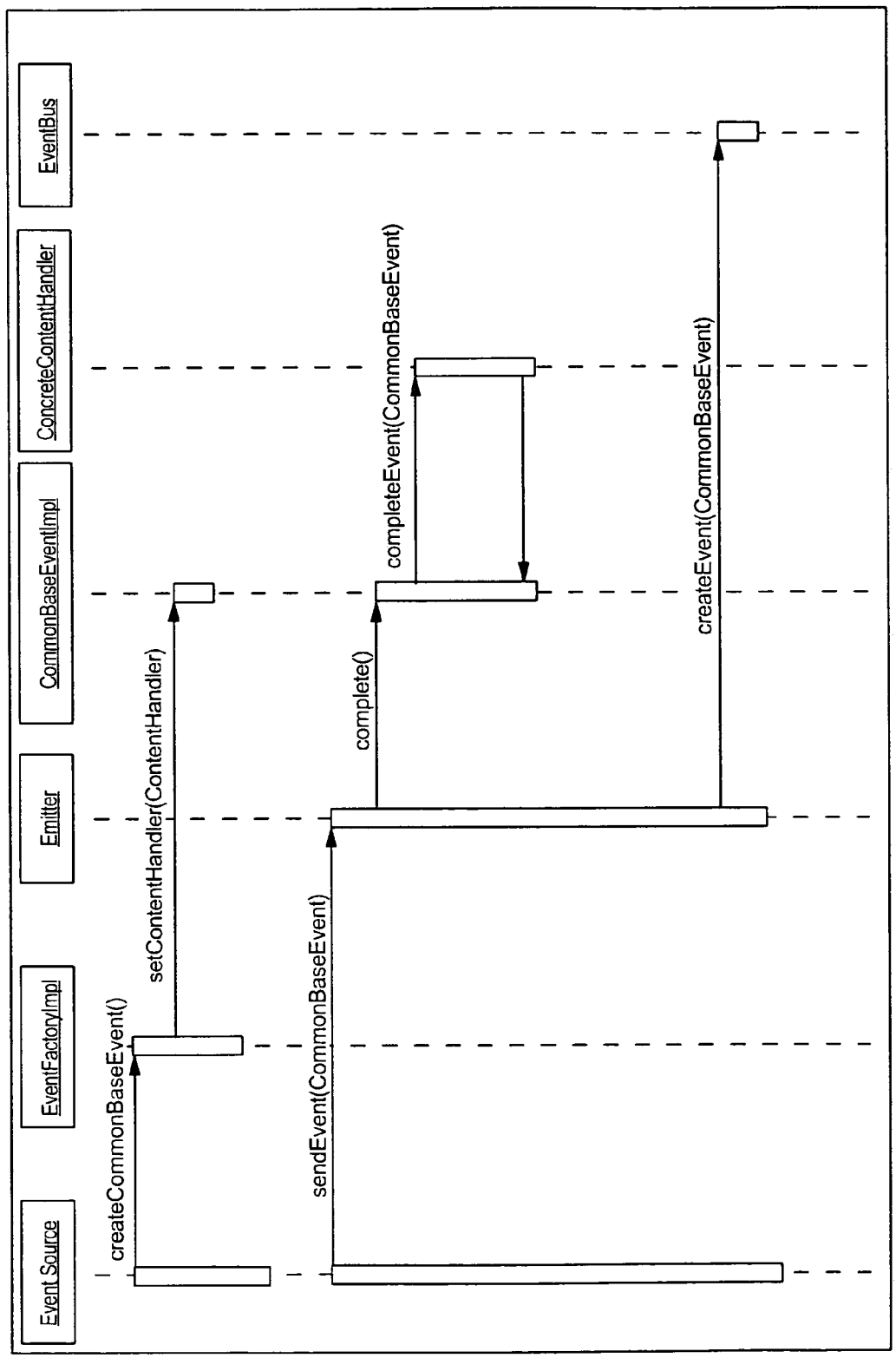

METHODS, SYSTEMS AND COMPUTER PROGRAM PRODUCTS FOR GENERATING EVENTS HAVING A COMMON EVENT FORMAT

FIELD OF THE INVENTION

The present invention relates to networks and more particularly to monitoring and/or analysis of network components.

BACKGROUND OF THE INVENTION

Information Technology (IT) systems, methods and computer program products, including, for example, computer networks, have grown increasingly complex with the use of distributed client/server applications, heterogeneous platforms and/or multiple protocols all on a single physical backbone. The control of traffic on networks is likewise generally moving from centralized information systems departments to distributed work groups. The growing utilization of computer networks is not only causing a move to new, high speed technologies, but is, at the same time, making the operation of computer networks more critical to day to day business operations. Furthermore, as computer systems become more distributed and, thereby, more inter-related, the number of different components of a system that may result in problems typically increases. For example, application integration, including integration across heterogenous systems, has increased the complexity of systems and the interdependence of systems while also increasing reliance on such systems, for example, for mission critical applications.

This increase in the complexity of systems may make problem determination and/or resolution more complex. In conventional systems, components, such as applications, middleware, hardware devices and the like, generate data that represents the status of the component. This component status data will, typically, be consumed by some management function utilized to monitor the system and/or for problem analysis/resolution. The management function may, for example, be a user reading a log file or it may be a management application that is consuming the data for analysis and/or display. In conventional systems, components and component owners are responsible for determining what data is provided, in terms of format, completeness and/or order of the data as well as the meaning of the data.

Such an ad hoc approach to component status information may be convenient for the component developer, however, the complexity of the management function may be increased. For example, the management function, may need some context for a status message from the component. In particular, the management function will, typically, need to know what a data message from a component represents, the format of the data, the meaning of the data and what data is available. For example, the management function may need to know that a particular message (e.g., message "123"), from a particular component (e.g., component "ABC") has a certain number of fields (e.g., three fields) and what data is in each of the fields (e.g., a first field is a timestamp, a second field is a queue name and a third field is a value for the queue name). Typically, no data other than the data provided by the component can be derived from the management system. Furthermore, this approach also assumes that the consumer of the data knows, not only the significance of the data fields, but also the format of the fields (e.g., the timestamp is in the mm/dd/yy format).

Furthermore, the cause of the problem that is reported by an error message may be reported by a component other than the component with the problem. Thus, a management function may need to know, not only the existence of the component, but the relationship between the components that are managed. Without such knowledge, the management function may not recognize that the source of the component is not the component reporting the error.

One difficulty that may arise from the use of differing component status formats is in the analysis of problems for differing components or from different versions of a component. Knowledge bases have conventionally been used to map component status data, such as error log messages, that are reported by components to symptoms and eventually to fixes for problems. For example, there are symptom databases utilized by International Business Machines Corporation, Armonk, N.Y., that map WebSphere error log messages to symptoms and fixes. These databases typically work on the assumption that if you see a specified error message (e.g., message "123") from a specified component (e.g., component "XYZ"), then a particular symptom is occurring (e.g., the performance is slow) and a predefined remedy (e.g., increase the parameter "buffsize" to 10) will likely fix the problem.

Furthermore, the use of differing component status formats in the analysis of problems for differing components or from different versions of a component may make it difficult for Information Technology (IT) specialists to write correlation rules to obtain status information about the system from data provided by two different components. For example, if a first vendor of a monitoring tool includes a certain status information field when reporting the amount of occupied memory of a device and a second vendor does not include the same field, or includes the field but calls it something different or formats it differently, the information provided by the devices may be difficult to use. In other words, the IT specialist may have to convert the formats of the fields to a common format before the information in the fields could be used efficiently. Due to time constraints, IT specialists typically cannot afford to write development and validation rules that consider all conditions.

SUMMARY OF THE INVENTION

Embodiments of the present invention provide methods, systems and/or computer program products for generating events having common formats by obtaining a populated common base event including source specific situation information for an event source. It is determined if a format of the populated common base event conforms to a predefined event format. A common event format representation of the populated common base event is generated based on the predefined event format if the format of the populated common base event does not conform to the predefined event format.

In some embodiments of the present invention, the populated common base event may be obtained from the event source. The event source may obtain a common base event associated with a content handler. The content handler may define the predefined event format. The event source may further populate the obtained common base event to provided the populated common base event.

In further embodiments of the present invention, the source specific situation information may be provided in a plurality of event fields. It may be determined if ones of the plurality of event fields conform to the predefined event format defined by the content handler. The format of the ones of the plurality of event fields that do not conform may be modified to conform to the predefined event format. It may also be determined if ones of the plurality of event fields are empty and the empty ones of the plurality of event fields may be populated with source specific situation information based on the predefined event format.

In still further embodiments of the present invention, the common event format representation of the populated common base event may be provided to an event server. The common event format representation of the populated common base event may be stored in a data store at the event server. The event server may be queried to obtain status information of a system associated with the event source based on the stored common event format representation.

In some embodiments of the present invention, an event factory may be associated with a directory service. The event source may be associated with the event factory by locating the event factory using the directory service and associating the content handler with the event factory. The common base event incorporating the content handler may be returned from the event factory to the event source.

In further embodiments of the present invention, the content handler may be requested to modify the common base event based on the predefined event format. The directory service may be a Java Naming and Directory (JNDI) Service. The common base event may include a date and/or time stamp, a situation type, an identity of the event source and/or an identity of a component reporting the situation type.

In certain embodiments of the present invention, the common event format representation of the common base event may be automatically generated based on the predefined event format when the common base event is provided from the event source.

As will further be appreciated by those of skill in the art, while described above primarily with reference to method aspects, the present invention may be embodied as methods, apparatus/systems and/or computer program products.

BRIEF DESCRIPTION OF THE DRAWINGS

FIGS. 5A through 5C are flow diagrams illustrating operations for generating a common event format representation of a common base event according to some embodiments of the present invention.

DETAILED DESCRIPTION OF THE INVENTION

Figure 1:
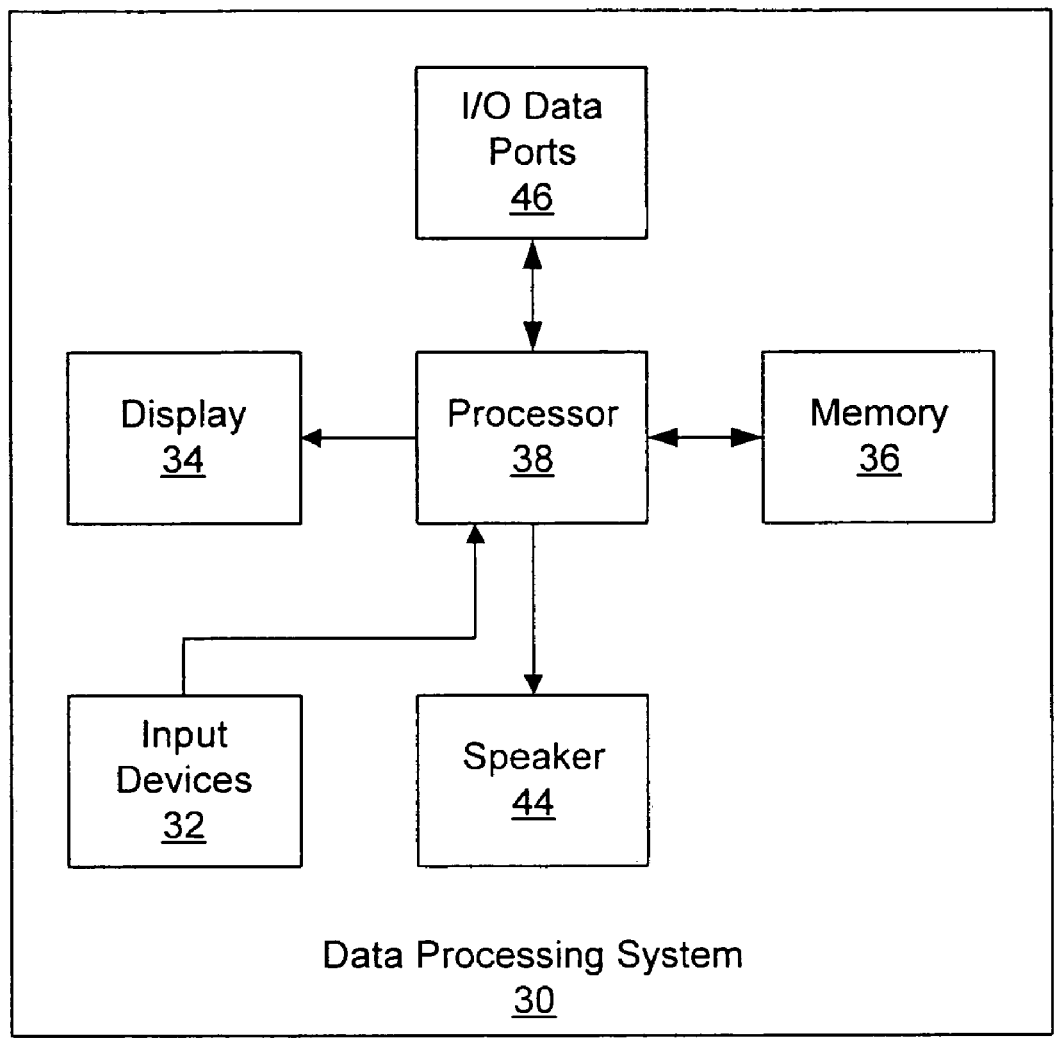
FIG. 1 is a block diagram of a data processing system suitable for use in a system according to some embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. A used herein the term and/or includes any and all combinations of one or more of the associated listed items.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to FIGS. 1 through 7D. Embodiments of the present invention provide methods, systems and/or computer program products that generate a common event format representation of a populated common base event from a specific event source, for example, a component or application, based on a predefined event format. The common event format representations of populated common base events may be provided to a central server from one or more event sources and may be stored at the central server. Thus, the source specific status information may be provided in a common format. Accordingly, it may be possible to reduce the variations in the data structures received at the central server and, therefore, simplify the process of mapping error messages or combinations of error messages to symptoms and fixes as discussed in further detail below.

Referring now to FIG. 1, a block diagram of data processing systems suitable for use in systems according to some embodiments of the present invention will be discussed. As illustrated in FIG. 1, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 2:
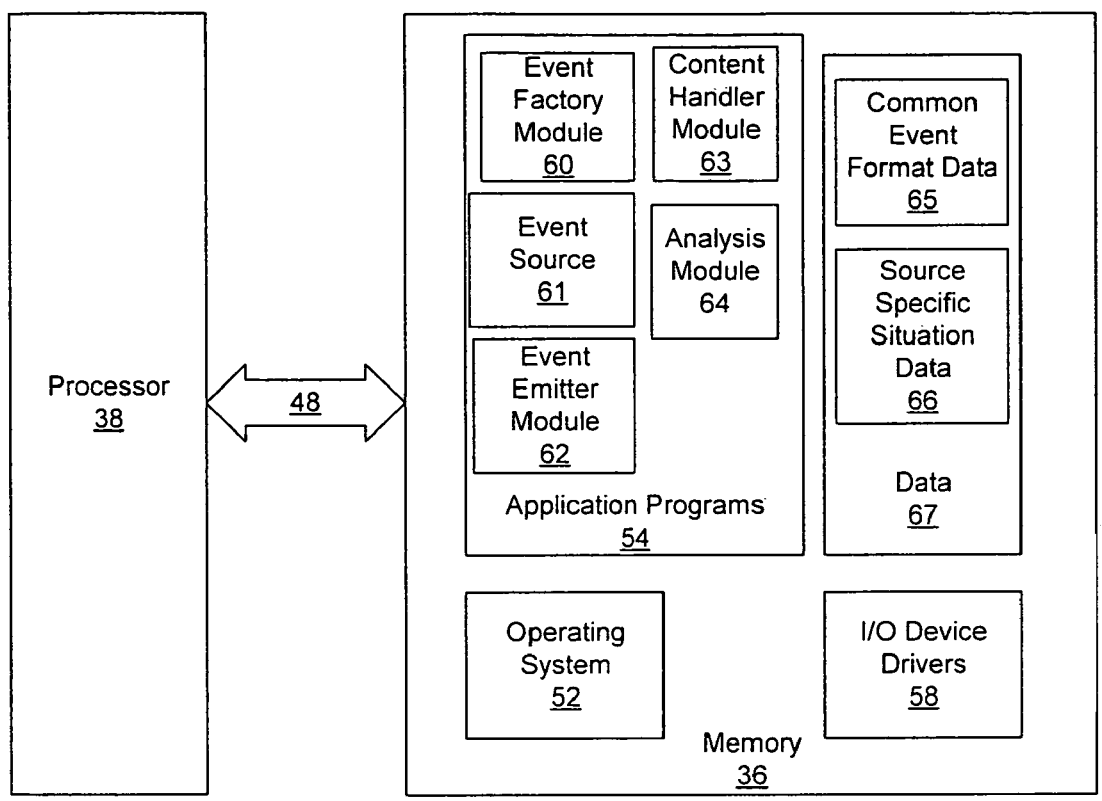
FIG. 2 is a more detailed block diagram of a system for generating common base events having a common event format according to further embodiments of the present invention.

FIG. 2 is a block diagram of data processing systems that illustrate systems, methods, and computer program products in accordance with embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIG. 2, the memory 36 may include several categories of software and data used in the data processing system 30: the operating system 52; the application programs 54; the input/output (I/O) device drivers 58; and the data 67. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30 and preferably include at least one application which supports operations for generating events having a common event format according to embodiments of the present invention. Finally, the data 67 represents the static and dynamic data used by the application programs 54, the operating system 52, the I/O device drivers 58, and other software programs that may reside in the memory 36.

As is further seen in FIG. 2, the application programs 54 may include an event factory module 60, an event source 61, and event emitter module 62, a content handler module 63 and/or an analysis module 64. The event factory module 60 may carry out operations described herein for generating instances of common base events incorporating the content handler module 63. The event source 61 may carry out operations described herein for obtaining an instance of the common base event, populating the instance of the common base event with source specific situation information and providing the populated common base event to the event emitter module 62. The event emitter module 62 may carry out operations described herein for obtaining the populated common base event from the event source 61 and requesting that the content handler module 63 modify the populated common base event. The content handler module 63 may carry out operations described herein for automatically modifying and formatting the populated common base event to provide the source specific situation information in a common event format representation of the populated common base event. Finally, the analysis module 64 may carry out operations described herein for analyzing the source specific situation information provided in the common event format representation of the common base event so as to allow mapping of error messages or combinations of error messages to symptoms and fixes.

The data portion 67 of memory 36, as shown in the embodiments illustrated in FIG. 2, may, optionally, include common event format data 65 and/or source specific situation data 66. The common event format data 65 may be analyzed and correlated by, for example, the analysis module 64 to provide a customer and/or a administrator with status information about the system and/or a suggested remedial course of action. The source specific situation data 66 may be data provided by the event source 61 before it is modified to conform to the predefined event format.

While the present invention is illustrated, for example, with reference to the event factory module 60, the event source 61, the event emitter module 62, the content handler module 63 and the analysis module 64 being application programs in FIG. 2, as will be appreciated by those of skill in the art, other configurations may also be utilized while still benefitting from the teachings of the present invention. For example, the event factory module 60, the event source 61, the event emitter module 62, the content handler module 63 and the analysis module 64 may also be incorporated into the operating system 52, the I/O device drivers 58 or other such logical division of the data processing system 30. Thus, the present invention should not be construed as limited to the configuration of FIG. 2 but is intended to encompass any configuration capable of carrying out the operations described herein.

The event factory module 60, the common base event, the event emitter module 62 and the content handler module 63 are described herein as being objects in an object oriented programming language, for example, Java® objects. In other words, the event factory module 60 is described herein as an event factory object, the common base event is described herein as a common base event object, the event emitter module 62 is described herein as an event emitter object and the content handler module 63 is described herein as a content handler object. For example, the content handler module 63 may be a completion object that is configured to automatically set property values of the common base event object based on a predefined event format. It will be understood that although the event factory module, the common base event, the event emitter module and the content handler module are discussed herein as being objects, embodiments of the present invention are not limited to this configuration. Embodiments of the present invention may take the form of an entirely hardware embodiment, an entirely software embodiment or an embodiment combining software and hardware aspects without departing from the teachings of the present invention.

Figure 3:
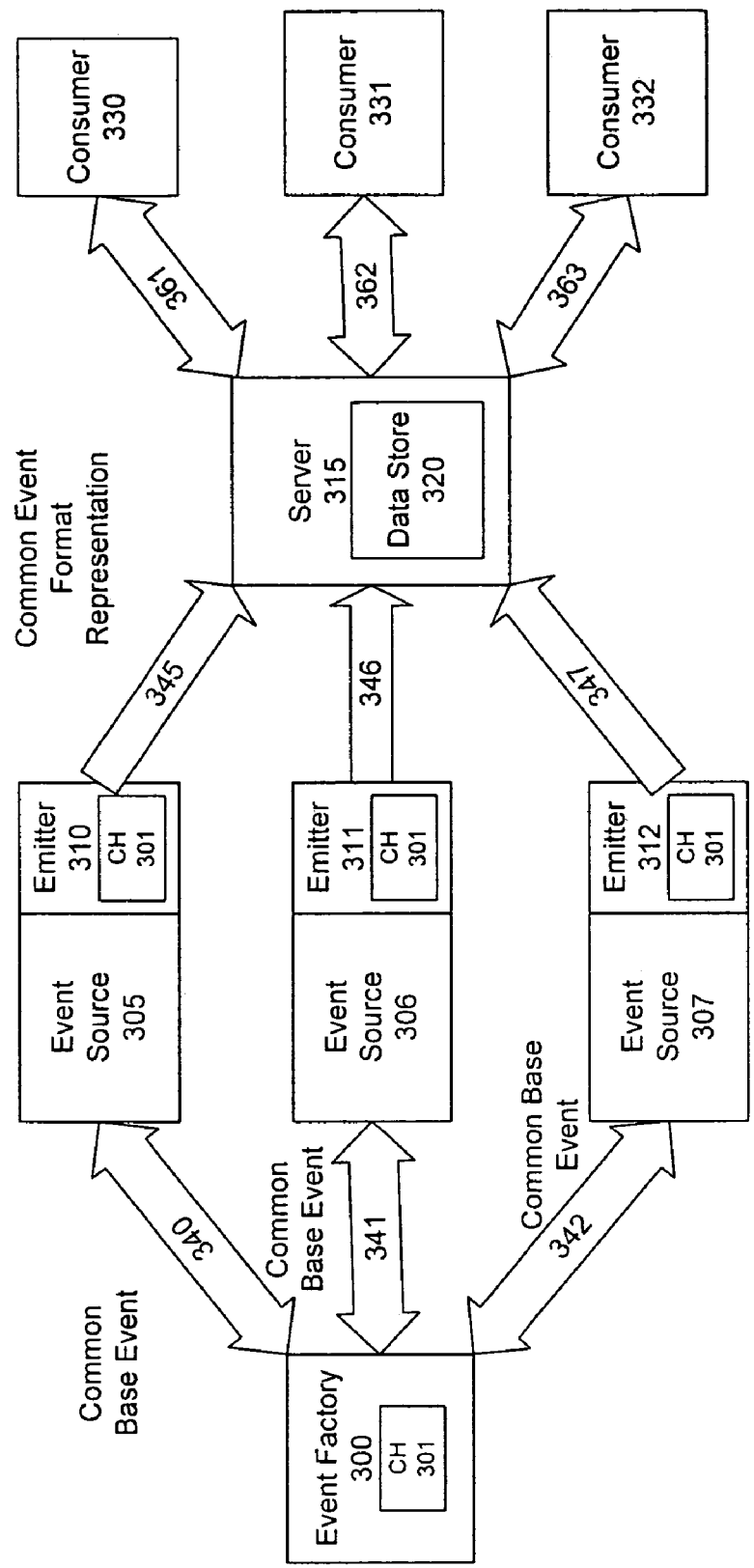
FIG. 3 is a block diagram of a system for generating common base events having a common event format according to some embodiments of the present invention.

FIG. 3 is a block diagram of a system incorporating application programs according to embodiments of the present invention. As seen in FIG. 3, an event source 305, 306, 307 may obtain an instance of a common base event object 340, 341, 342 from an event factory object 300, for example, a Java® object factory. The event factory object 300 may be associated with a directory service, for example, a Java Naming and Directory (JNDI) service. The event source 305, 306, 307 may locate the event factory object 300 using the directory service. As further illustrated, the content handler object 301 may be associated with the event factory object. Accordingly, instances of the common base event objects 340, 341, 342 provided to the event source 305, 306, 307 from the event factory object 300 may incorporate the content handler object 301. Thus, upon request, an instance of the common base event object 340, 341, 342 is obtained at the event source 305, 306, 307 and the event source 305, 306, 307 populates the common base event object 340, 341, 342 with source specific situation information. The source specific situation information can be related to anything that happens anywhere in the computing infrastructure, such as a server shutdown, a disk-drive failure, or a failed user login.

An event factory object 300 may be accessed by the event source 305, 306, 307 in two ways. If no event factory object 300 has been associated with the directory service, a new event factory object may be created using, for example, an EventFactoryFactory object. The EventFactoryFactory object will be discussed further below. When the event factory object is created a content handler object 301 may be specified to provide automatic content completion and/or standardization of populated common base event objects upon transmission from the event source 305, 306, 307 as discussed further below. On the other hand, an existing event factory object 300 that has been bound into a directory service, for example, a JNDI service, may also be used.

As discussed herein, a "common base event" or "common base event object" may include source specific situation information. The common base event object may be a structured notification that reports information related to a situation associated with the event source 305, 306, 307. For example, in some embodiments of the present invention, the common base event may report three kinds of source specific information: the situation itself, i.e. what has happened, the identity of the affected component (event source 305, 306, 307), for example, the server that has shut down, and the identity of the component that is reporting the situation. This information may be reported in a plurality of fields associated with the event. In some embodiments of the present invention, the event source reporting the situation may be the same as the affected event source. In certain embodiments of the present invention, the common base event may be an XML element including properties that provide all three kinds of information. These properties may be encoded as attributes and/or subelements of the root element.

It will be understood that although common base events are discussed herein as including three properties, embodiments of the present invention are not limited to this configuration. For example, a common base event may also include extended data elements, which are application/hardware-specific elements that can contain any kind of information relevant to the situation, such as a time and/or date stamp.

The populated common base event object may be provided from the event source 305, 306, 307 to the event emitter object 310, 311, 312, for example, a local object. The event emitter object 310, 311, 312 may obtain the populated common base event object from the event server 305, 306, 307 and may request that the content handler object 301 perform any modifications to the content and/or format of the populated common base event object to provide a common event format representation 345, 346, 347 of the populated common base event object that conforms to a predefined event format, for example, the common base event model. As used herein, the "common base event model" is a standard defining a common representation of events that may be used by, for example, enterprise management and business applications. In some embodiments of the present invention, the standard may support encoding of logging, tracing, management, and business events using a common XML-based format, making it possible to correlate different types of events that originate from different applications. The basic concept behind the common base event model is the situation. As discussed above, an event includes source specific situation information. The reported situation can be anything that happens anywhere in the computing infrastructure, such as a server shutdown, a disk-drive failure, or a failed user login. The common base event model may define a set of standard situation types that may accommodate situations that occur with the most frequency, for example, StartSituation and CreateSituation.

The event emitter object 310, 311, 312 may be an interface between the event source 305, 306, 307 and the event server 315 and may request that the content handler object 301 automatically perform content standardization and/or completion of the populated common base event object based on the predefined event format. In other words, the event source 305, 306, 307 may not interact directly with the event server 315. Instead, the event server 315 may interact with the event emitter object 310, 311, 312. As used herein, the "event emitter" or "event emitter object" 310, 311, 312 may be configured to obtain populated common base event objects, request that the content handler object 301 perform content completion and/or standardization of the populated common base event object and provide the completed common base event objects to the event server 315. In general, the event emitter object 310, 311, 312 may handle the details of event transmission. Thus, the developer of an event source 305, 306, 307 may not be concerned about the event server location or the underlying transmission mechanism. Details with respect to the event server location and/or underlying transmission mechanism may be governed by, for example, an emitter factory profile. The emitter factory profile may be a configuration object created by an administrator and bound in JNDI as an instance of the com.ibm.events.emitter.EmitterFactory interface.

Referring again to FIG. 3, the content handler object 301 receives the request for content completion and/or standardization from the event emitter object 310, 311, 312 and determines if a format of the populated common base event object conforms to the predefined event format, for example, the common base event model. The content handler object 301 may be further configured to generate a common event format representation 345, 346, 347 of the populated common base event object if it is determined that the populated common base event object does not conform to the predefined event format. In some embodiments of the present invention, the common base event object may include one or more event fields. In these embodiments of the present invention, the content handler object 301 may determine if ones of the plurality of event fields conform to the predefined event format defined by the content handler object 301 and modify the format of the ones of the plurality of event fields that do not conform to the predefined event format. Furthermore, the content handler object 301 may determine if ones of the plurality of event fields are empty and populate the empty ones of the plurality of event fields with source specific situation information based on the predefined event format.

The event server 315 is the conduit between the event sources 305, 306, 307 and the consumers 330, 331, 332. The event server 315 receives the common event format representations of the populated common base event objects (or populated base event objects) 345, 346, 347 from the event emitter objects 310, 311, 312 and stores the common format representations of the populated common base event objects 345, 346, 347 in, for example, a persistent data store 320 at the event server 315. Consumers 330, 331, 332 may query the event server 315 to obtain source specific status information 361, 362, 363 contained in the events and may use the source specific status information 361, 362, 363 to diagnose and/or fix problems in the system.

It will be understood that embodiments of the present invention illustrated in FIG. 3 are provided for exemplary purposes only and that embodiments of the present invention are not limited to this configuration. For example, although FIG. 3 only includes a single event factory module 300 and content handler module 301, embodiments of the present invention can have two or more event factories and associated content handlers without departing from the scope of the present invention. Furthermore, although the system illustrated in FIG. 3 includes three event sources and three customers, embodiments of the present invention are not limited to this configuration. For example, systems according to embodiments of the present invention may have less than or more than three event sources and/or customers without departing from the scope of the present invention.

Figure 4:
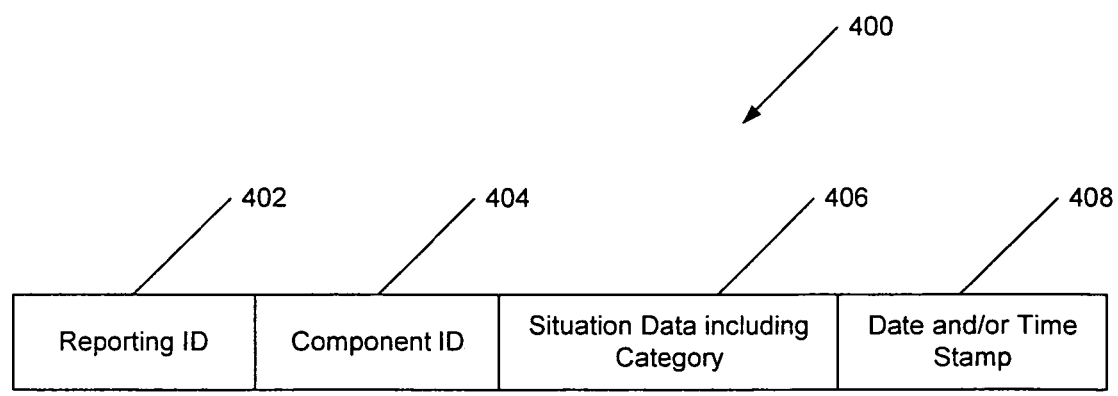
FIG. 4 is a diagram illustrating fields of an event according to some embodiments of the present invention.

Referring now to FIG. 4, a diagram of fields of an event 400 according to some embodiments of the present invention will be discussed. As illustrated in FIG. 4, the source specific situation information may be provided in a series of fields. The event fields 400 may include an identification of the component reporting the status (Reporting ID 402), an identification of the component about which the status is reported (Component ID 404), an identification of the situation category that identifies the status of the component (Situation Category 406), and/or a date and/or time stamp 408. The event fields 400 provided in FIG. 4 are provided for exemplary purposes only and, therefore, embodiments of the present invention should not be limited to this configuration.

For example, an event source may populate the situation category field 406 with an error message, which indicates a disk drive failure at the source. The content handler object may determine if the situation category field 406 including the error message conforms to a predefined event format. If the situation category field 406 does not conform, the content handler object may standardize the error message, for example, the error message may be replaced with the words "disk drive failure." Thus, anytime an event source experiences a disk drive failure, the situation category field 406 of the common event format representation of the common base event reporting the failure may include the words disk drive failure.

Furthermore, a field, for example, the time and/or date stamp field 408, of the populated common base event may be empty. The content handler object may be further configured to complete the time and/or date stamp field 408 with source specific situation information and format the time and/or date stamp to conform to the predefined event format. Accordingly, each field of the common event format representation of the common base event may be populated and provided to the event server in a format that conforms to the predefined event format.

Flow diagrams illustrating operations according to some embodiments of the present invention will be discussed with respect to FIGS. 5A through 5C. The shaded blocks in the diagrams of FIGS. 5A through 5C represent functionalities of a directory service, for example, a JNDI service, and the non-shaded blocks represent functionalities of some embodiments of the present invention.

Figure 5A:
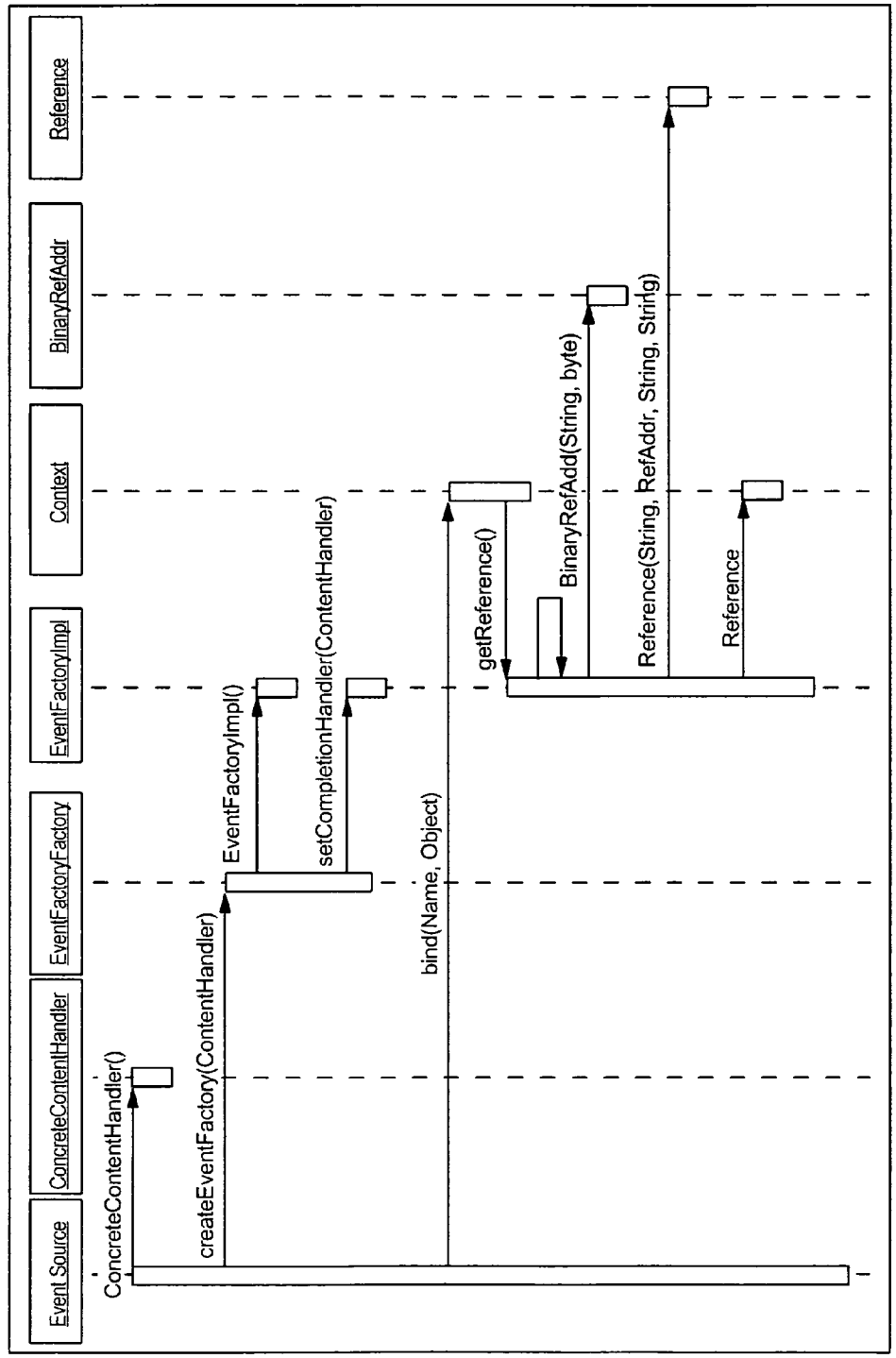
Figure 5B:
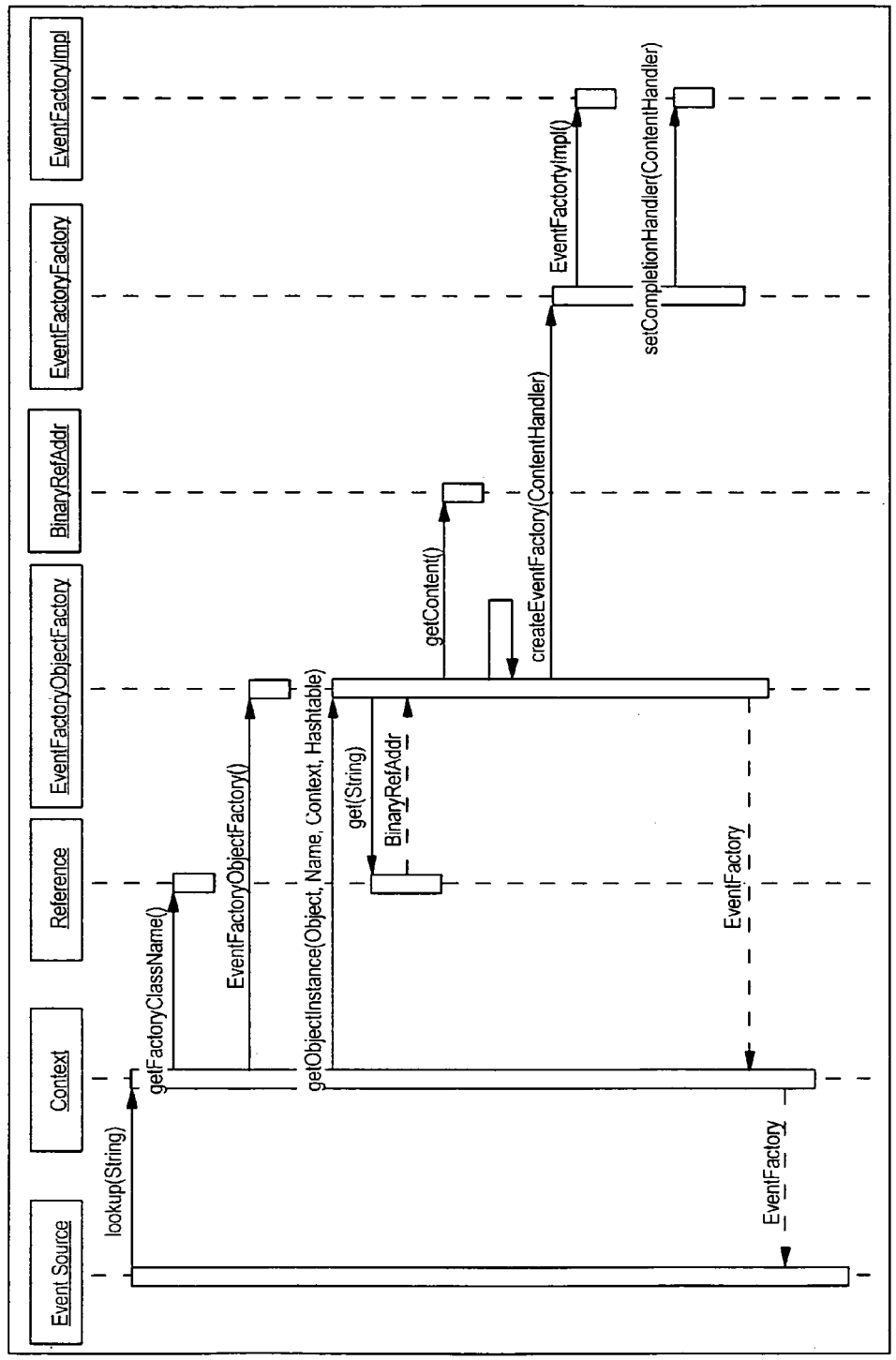

As used in the flow diagrams of FIGS. 5A through 5C, the EventFactoryFactory object refers to a factory object for instances of the EventFactory interface. It may allow an external application to create an event factory object in association with a content handler object if an event factory object does not already exist. The EventFactory object is a generated factory object for common base event elements and is augmented with content completion and/or standardization mechanisms. In other words, the EventFactory object propagates the ContentHandler object associated with the EventFactory to all CommonBaseEvent instances that it creates. Finally, the ContentHandler object is an interface implemented by an external event source that wishes to modify the contents of CommonBaseEvent object instances created by the EventFactory object.

As illustrated in FIG. 5A, the EventFactoryFactory object is used to create an instance of an EventFactory including a reference to the ContentHandler object. The event source then binds itself to a directory service "bind(Name, Object)". As discussed above, the event source may be, for example, a component in the system, an application or the like without departing from the scope of the present invention. After the event source is bound to the directory service, a normal JNDI mechanism is performed. In particular, the JNDI service asks the object being bound for a java.naming.Reference ("getReference( )") instance that may be used when the object is looked up by, for example, an event source. At this point, the EventFactory implementation object uses Java® serialization to convert the ContentHandler associated with the EventFactory object to a byte stream. This byte stream may be inserted into a java.naming.BinaryRefAddr and then added into the JNDI reference to be returned to the JNDI component. The returned reference may also contain a class name if the java.naming.spi.ObjectFactory that may be used during a lookup for the EventFactory object.

Referring now to FIG. 5B, the event source may lookup the event factory object using the directory service. In particular, the sequence illustrated in FIG. 5B shows the process used to lookup an instance of an EventFactory object using a directory service. As illustrated, an event source/application requests a lookup from a javax.naming.Context object. The JNDI component retrieves the javax.naming.reference instance initially bound to JNDI. Once the JNDI component detects that the reference indicates that the EventFactoryObjectFactory class as the javax.naming.spi.ObjectFactory behind the creation of the EventFactory instances, it requests it to recreate the EventFactory instance based on the Reference object bound to JNDI. The EventFactoryObjectFactory uses the serialized version of the ContentHandler object inside the reference to rebuild the final EventFactory object before returning it to the event source/application. As further illustrated in FIG. 5B, the event factory object may be rebuilt with a reference to a content handler object.

As illustrated in FIG. 5C, the event source request a CommonBaseEvent using the EventFactory object, which binds the common base event object to the content handler object before returning an instance of the CommonBaseEvent object to the event source. The event source provides the event to the event emitter object and the event emitter object issues a "complete( )" call on the event at hand, which in turn requests the ContentHandler object to automatically perform content completion and/or standardization for the common base event object. The flow diagrams of FIGS. 5A through 5C are provided for exemplary purposes only and, therefore, embodiments of the present invention should not be limited to embodiments illustrated therein.

Figure 6:
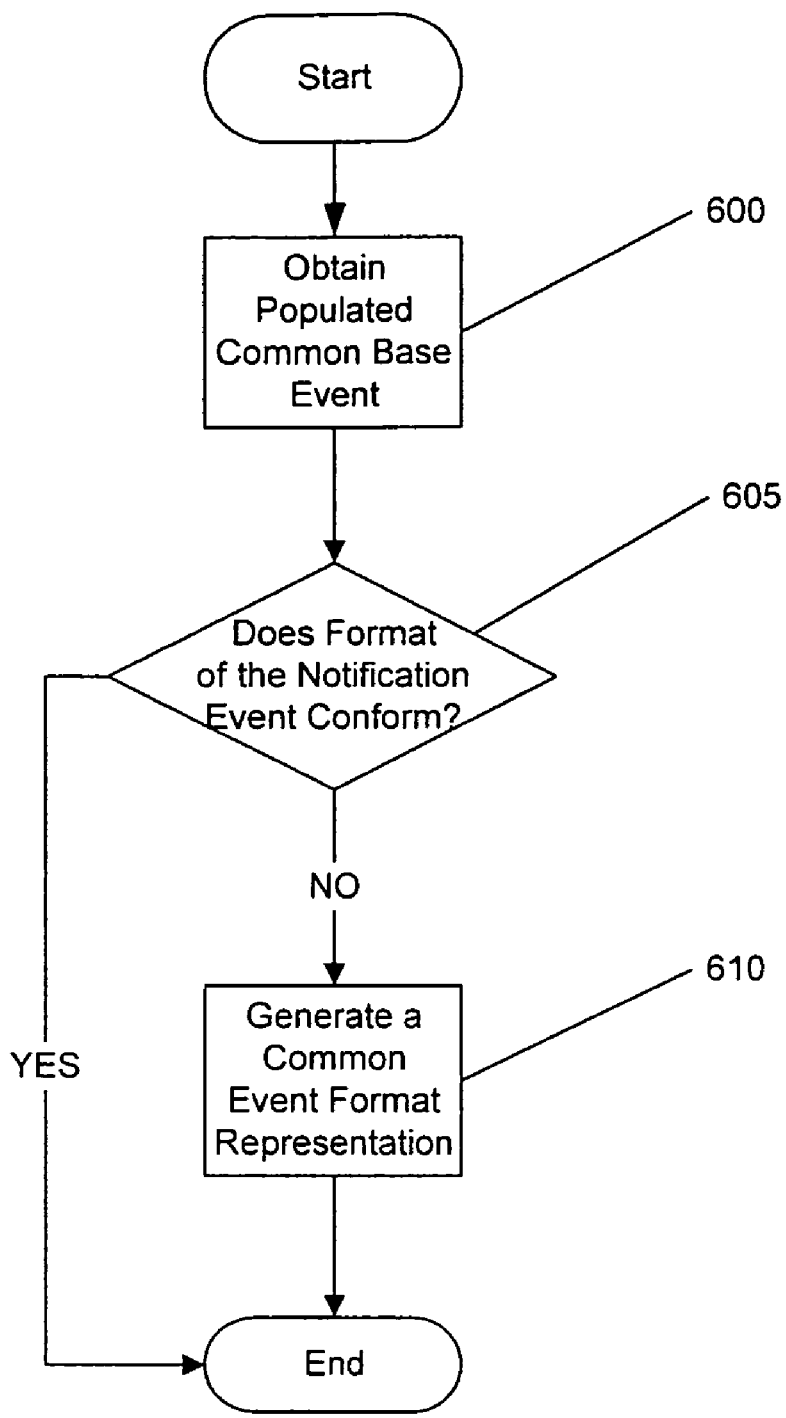
FIG. 6 is a flowchart illustrating operations for generating a common base event having a common event format according to some embodiments of the present invention.
Figure 7A:
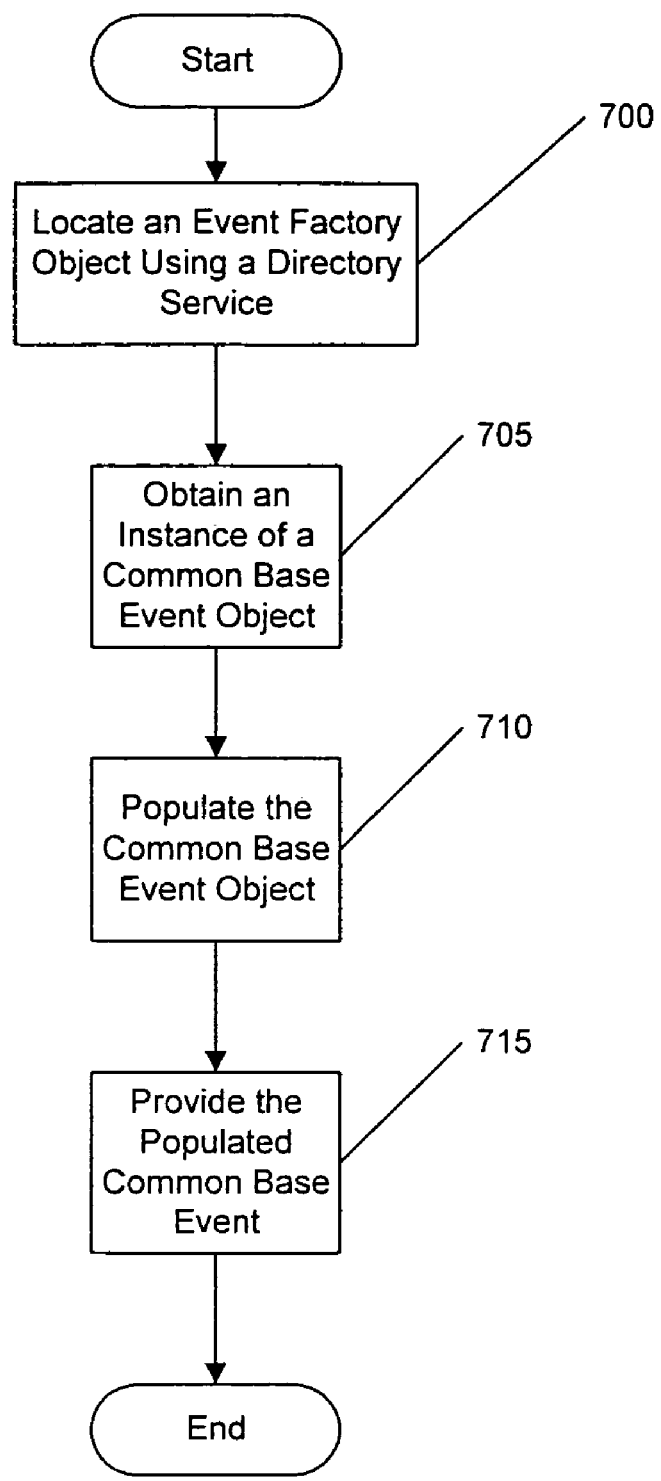
FIG. 7A is a flowchart illustrating operations of event servers according to further embodiments of the present invention.
Figures 7B, 7C:
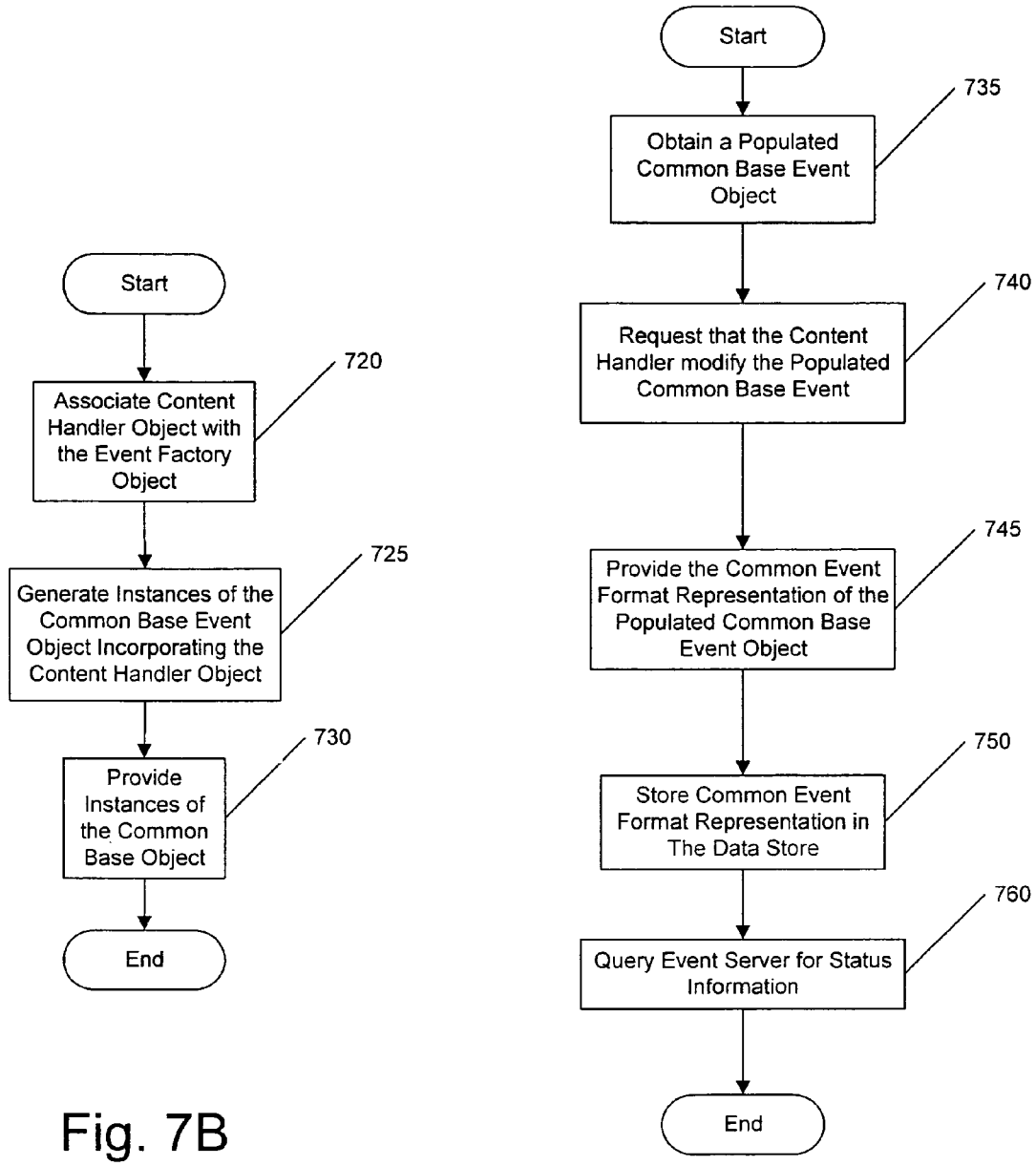
FIG. 7B is a flowchart illustrating operations of event factories according to further embodiments of the present invention.
FIG. 7C is a flowchart illustrating operations of event emitters and central servers according to still further embodiments of the present invention.
Figure 7D:
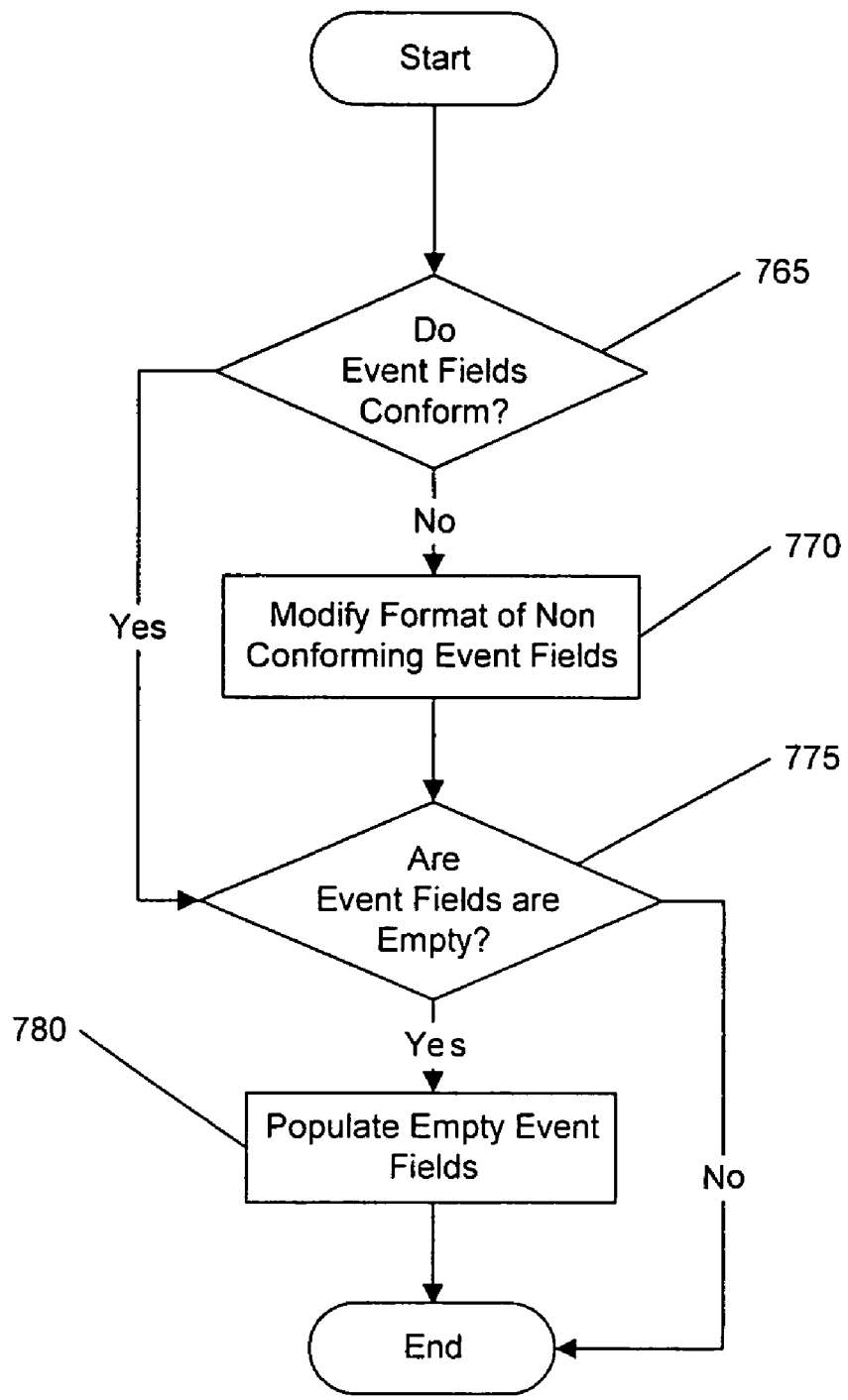
FIG. 7D is a flowchart illustrating operations of content handlers according to some embodiments of the present invention.

Operations according to embodiments of the present invention will now be described with reference to the flowcharts of FIGS. 6 through 7D. FIG. 6 is a flowchart illustrating operations that may be carried out according to embodiments of the present invention for the generation of events having a common event format.

As illustrated in FIG. 6, operations begin at block 600 by obtaining a populated common base event object. The populated common base event object may be obtained by an event emitter object from an event source, for example, a component of the system or an application. In some embodiments of the present invention, a common base event object is provided to the event source from an event factory object and is populated at the event source with source specific situation information to provide the populated common base event object.

It is determined if a format of the populated common base event object conforms to a predefined event format (block 605), for example, a common base event model. In other words, it is determined if fields of the event are presented in the proper format, for example, is the date in the form of mm/dd/yy, and if all the fields of the event are populated with source specific situation information. If it is determined that the format of the populated common base event object does not conform to the predefined event format (block 605), a common event format representation of the populated common base event object is generated based on the predefined event format (block 610). If, on the other hand, it is determined that the format of the populated common base event object does conform to the predefined event format (block 605), a common event format representation need not be generated because the common base event object is already in the common format.

Operations of event sources according to further embodiments of the present invention will be discussed with respect to FIG. 7A. Operations begin at block 700 by locating an event factory object, for example, a Java® object factory, with a directory service. The directory service may be, for example, a JNDI service. As discussed above, the event factory object may be an existing event factory object or an event factory object may be created without departing from the scope of the present invention.

An event source can create an event factory object using the EventFactoryFactory object as discussed above. Event factory objects according to embodiments of the present invention are augmented with content completion and/or standardization mechanisms. In other words, the event factory object is associated with a content handler object. The content handler object is an interface implemented by an application that modifies the contents of the common base event object created by the event factory object. Thus, the content completion and/or standardization mechanisms of the content handler object allow the common event format representations of the populated common base event objects to be created. The content handler object may be configured to automatically perform content completion and/or standardization responsive a request from the event emitter object.

Referring now to the flowchart of FIG. 7B, operations of event factories according to some embodiments of the present invention will be discussed. Once the event source is associated with the event factory object (700 of FIG. 7A) the event factory object may be rebuilt with a reference to the content handler object associated with the event factory object (block 720). The event factory object may generate instances of the common base event object incorporating the associated content handler object (block 725). The instances of the common base event object may be provided to event sources from the event factory object (block 730). Referring again to FIG. 7A, the event source may obtain an instance of the common base event object incorporating the content handler object (block 705). The event source may populate the common base event object with event source specific situation information (block 710) and provide the populated common base event object to the event emitter object (block 715).

Referring now to the flowchart of FIG. 7C, operations of event emitter objects and event servers according to further embodiments of the present invention will be discussed. The populated common base event object may be obtained by an event emitter object (block 735). The event emitter object may request that the content handler object perform any modifications of the content of the populated common base event object based on a predefined event format (block 740).

Referring now to the flowchart of FIG. 7D, operations of the content handler object according to some embodiments of the present invention will be discussed. The content handler object may determine if the format of the fields of the event conform to the predefined event format (block 765). If it is determined that the fields of the common base event object conform (block 765), it is determined if any of the event fields of the common base event object are empty (block 775). If none of the event fields of the common base event object are empty (block 775), the common base event object having a common event format representation of the common base event object is provided to a server (block 745 of FIG. 7C). If, on the other hand, it is determined that at least one of the fields of the common base event object are empty (block 775), the at least one field is populated with source specific situation information (block 780) and the common event format representation of the populated common base event is provided to the server (block 745 of FIG. 7C). If, on the other hand, it is determined that the event fields do not conform to the predefined event format (block 765), the format of the event fields of the common base event object are modified (block 770) based on the predefined event format.

Referring again to FIG. 7C, the provided common event format representation of the common base event object may be stored at the event server in, for example, a data store (block 750). The data store may contain events from multiple event sources in the system. Each of the events in the data store may be provided in the common event format representation of the populated common base event so as to allow the information provided by the events to be analyzed more easily. For example, customers and/or administrators may query the event server for status information related to the system (block 760). This status information may be provided in the events stored in the data store. Accordingly, the customer and/or administrator can ask for information related to, for example, disk capacity, and this information may be provided for multiple event sources. Thus, the process of obtaining status information about a system may be simplified according to embodiments of the present invention.

It will be understood that although the event factory, the common base event, the content handler and the event emitter are discussed herein as being objects in an object oriented programming language, for example, Java®, embodiments of the present invention are not limited to this configuration.

As briefly discussed above with respect to FIGS. 1 through 7D, instances of a common base event object associated with a content handler object is provided to an event source by an event factory object. The event source populates the instance of the common base event object with source specific situation information and the content handler object automatically modifies the content of the populated instance of the common base event object to provide the source specific situation information in a common format. Supplying source specific situation information to a central server from multiple event sources in a common format may simplify content management and correlation rules associated therewith.

It will be understood that embodiments of the present invention discussed herein may be used in combination with event management solution products. For example, embodiments of the present invention may be used in combination with Tivoli TEC. In some event management solutions, like Tivoli TEC, the vendor for the central server and the event emitter at the event source are the same, in this case Tivoli. Thus, the event emitter may be used as a unifying point where the central system administrator may choose to deploy business logic that modifies common base event content prior to providing the common base event to the central server so as to provide all events to the central server in a common event format representation of the common base event as discussed above.

It will be further understood that the use of embodiments of the present invention are not limited event management systems. For example, embodiments of the present invention may be used in combination with any application that may produce events as part of the functionality of the application, such as middleware applications, operating systems, enterprise solutions, monitoring products, data mining applications and the like.

The flowcharts and block diagrams of FIGS. 1 through 7D illustrate the 20 architecture, functionality, and operation of possible implementations of systems, methods and computer program products for generating events having a common format according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of generating events having a common event format, comprising:
    associating an event factory with a directory service;
    locating the event factory using the directory service;
    associating a content handler with the event factory;
    obtaining a common base event associated with the content handler;
    populating the common base event with source specific situation information to provide a populated base event;
    returning the populated base event incorporated in the content handler from the event factory to the event source;
    determining if a format of the populated base event conforms to a predefined event format, wherein the predefined event format is defined by the content handler; and
    generating a common event format representation of the populated base event based on the predefined event format if the format of the populated base event does not conform to the predefined event format.

2. The method of claim 1, wherein the source specific situation information is provided in a plurality of event fields and wherein the generating a common event format representation of the populated base event comprises:
    determining if ones of the plurality of event fields conform to the predefined event format defined by the content handler;
    modifying the format of the ones of the plurality of event fields that do not conform to the predefined event format;
    determining if ones of the plurality of event fields are empty; and
    populating the empty ones of the plurality of event fields with source specific situation information based on the predefined event format.

3. The method of claim 2, further comprising:
    providing the common event format representation of the populated base event to an event server; and
    storing the common event format representation of the populated base event in a data store at the event server.

4. The method of claim 3, further comprising:
    querying the event server to obtain status information of a system associated with the event source based on the stored common event format representation of the populated base event.

5. The method of claim 1, wherein the directory service comprises a Java Naming and Directory (JNDI) service.

6. The method of claim 1, wherein the populated base event comprises a date and/or time stamp, a situation type, an identity of the event source and/or an identity of a component reporting the situation type.

7. The method of claim 1, wherein generating comprises automatically generating a common event format representation of the populated base event based on the predefined event format.

* * * * *